United States Patent
Omran et al.

(10) Patent No.: US 12,421,127 B1
(45) Date of Patent: Sep. 23, 2025

(54) METHOD OF MANUFACTURING A NANOCOMPOSITE

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/064,227

(22) Filed: Feb. 26, 2025

(51) Int. Cl.
*C01F 5/38* (2006.01)
*B82Y 30/00* (2011.01)
*C01B 21/06* (2006.01)
*C01F 7/441* (2022.01)
*C01G 49/00* (2006.01)

(52) U.S. Cl.
CPC ............ *C01F 5/38* (2013.01); *B82Y 30/00* (2013.01); *C01B 21/0605* (2013.01); *C01F 7/441* (2013.01); *C01G 49/0018* (2013.01); *C01P 2002/01* (2013.01); *C01P 2002/72* (2013.01); *C01P 2004/04* (2013.01); *C01P 2004/64* (2013.01)

(58) Field of Classification Search
None
See application file for complete search history.

(56) References Cited

FOREIGN PATENT DOCUMENTS

| CN | 106076261 B | 2/2019 |
| CN | 106518047 B | 4/2019 |
| CN | 118079923 A | 5/2024 |

OTHER PUBLICATIONS

Chen et al.; Photocatalytic Production of Hydrogen Peroxide Using g-C3N4 Coated MgO—Al2O3—Fe2O3 Heterojunction Catalysts Prepared by a Novel Molten Salt-Assisted Microwave Process; Acta Phys.-Chim. Sin., 33 (12), 2532-2541; 2017.*
Xin et al.; Photocatalytic Production of Hydrogen Peroxide Using g-C3N4 Coated MgO—Al2O3—Fe2O3 Heterojunction Catalysts Prepared by a Novel Molten Salt-Assisted Microwave Process; Acta Phys.-Chim. Sin., 33(12), 2532-2541; 2017.*

(Continued)

*Primary Examiner* — Guinever S Gregorio
(74) *Attorney, Agent, or Firm* — Oblon, McClelland, Maier &Neustadt, L.L.P.

(57) ABSTRACT

A method of manufacturing a nanocomposite may include combining a magnesium salt, an aluminum salt, and a ferric salt in stoichiometric proportions within 5 mol. % in an aqueous solvent including menthol or dextrose, to obtain a first mixture, heating the first mixture to remove at least 99.5 wt. % of the aqueous solvent to obtain a first solid, grinding the first solid into a first powder, calcining the first powder at a temperature of about 600° C. to 800° C. for a time of about 2 to 4 hours to obtain a second solid, grinding the second solid and urea, in an amount sufficient to form the nanocomposite, into a second powder, heating the second powder at a temperature of about 550° C. to 650° C. for a time of about 15 minutes to 1.5 hours to obtain the nanocomposite.

20 Claims, 5 Drawing Sheets

(56) References Cited

OTHER PUBLICATIONS

E Flahaut, et al.. "Carbon nanotube-metal-oxide nanocomposites: microstructure, electrical conductivity and mechanical properties". Acta Materialia, vol. 48, Issue 14, Sep. 1, 2000. pp. 3803-3812, 6 pages.

Milad Zehtab Salmasi, et al., "Spinel $MgAl_2O_4$ nanospheres coupled with modified graphitic carbon nitride nanosheets as an efficient Z-scheme photocatalyst for photodegradation of organic contaminants", Applied Surface Science, vol. 585, Feb. 5, 2022, 152615, 10 pages.

* cited by examiner

METHOD OF MANUFACTURING A NANOCOMPOSITE

BACKGROUND

Technical Field

The present disclosure is directed towards nanocomposite synthesis, and more particularly, towards a method of manufacturing a nanocomposite including 10% graphitic-$C_3N_4$@$Fe_2O_3$/$MgAl_2O_4$.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Energy storage devices, such as supercapacitors, require materials with high specific surface area, excellent electrical conductivity, and chemical stability to achieve desirable performance. Carbon nanomaterials have emerged as a promising class of materials for such applications due to their properties and versatility. Carbon nanomaterials possess a highly specific surface area, which facilitates increased contact with electrolytes, thereby enhancing the active area essential for efficient charge storage and discharge processes. Furthermore, carbon nanomaterials exhibit excellent electrical conductivity, which is crucial for improving charge transfer efficiency and overall device performance.

In addition to the inherent properties, carbon nanomaterials are chemically stable and can be easily loaded with electrochemically active species to further enhance energy storage capabilities. The cost-effectiveness and environmentally friendly nature of carbon nanomaterials render them a preferred choice for various energy storage applications. Moreover, the integration of carbon nanomaterials into composite structures or combination with other materials, such as metal films or graphene, has been shown to significantly improve the energy density and rate performance of supercapacitors.

Among carbon-based materials, graphitic carbon nitride (g-$C_3N_4$) presents several advantages over traditional activated carbon for supercapacitor applications. g-$C3N_4$ is an active photocatalyst under visible light, in contrast to activated carbon, which lacks photocatalytic activity. The aforementioned property permits g-$C_3N_4$ to harness solar energy for charge storage, providing a renewable and sustainable energy solution. Additionally, g-$C_3N_4$ has a narrower bandgap compared to activated carbon, permitting g-$C_3N_4$ to absorb a broader spectrum of light wavelengths. The aforementioned characteristic enhances energy conversion efficiency and contributes to improved supercapacitor performance. Furthermore, g-$C_3N_4$ can be readily modified and tailored through techniques such as carbon-defect engineering and two-dimensional structural engineering. The modifications may enhance the structural properties of g-$C_3N_4$, such as increasing surface area and porosity, which are critical factors for effective charge storage in supercapacitors. As a result, g-$C_3N_4$ exhibits superior photoactivity, broader light absorption capabilities, and improved structural properties compared to activated carbon.

Further research has been reported in *Surfaces* 2024, 7(3), 493-507, and *Molecules* 2024, 29(9), 2082, each of which is incorporated by reference herein. Despite these advancements, current methods for synthesizing g-$C_3N_4$-based materials face several limitations. Traditional synthesis methods may result in agglomeration, limited surface area, and poor dispersion of active materials, thereby restricting the overall performance of the supercapacitor. Moreover, the scalability and cost-effectiveness of these methods remain a challenge for large-scale commercial applications. The stability and durability of the synthesized materials are to be further improved to ensure long-term operational efficiency in practical applications. Hence, a requirement arises for a better and more efficient method of producing nanomaterials.

Accordingly, one object of the present disclosure is to provide a method of manufacturing a nanocomposite, that may circumvent the above listed drawbacks and limitations of the methods known in the art.

SUMMARY

In an exemplary embodiment, a method of manufacturing a nanocomposite is described. The method may include combining a magnesium salt, an aluminum salt, and a ferric salt in stoichiometric proportions within 5 mol. % in an aqueous solvent including menthol or dextrose, to obtain a first mixture. The method further may include heating the first mixture to remove at least 99.5 wt. % of the aqueous solvent to obtain a first solid, grinding the first solid into a first powder, calcining the first powder at a temperature in a range of from 600° C. to 800° C. for a time in a range of 2 to 4 hours to obtain a second solid, grinding the second solid and urea, in an amount sufficient to form the nanocomposite, into a second powder, heating the second powder at a temperature in a range of from 550° C. to 650° C. for a time in a range of 15 minutes to 1.5 hours to obtain the nanocomposite, including graphitic $C_3N_4$, $Fe_2O_3$, and $MgAl_2O_4$ in a mass relationship to each other in a range of 5 to 15:2 to 7:75 to 95.

The average pore distribution of the nanocomposite may be bimodal. The (Brunauer-Emmett-Teller) BET specific surface area of the nanocomposite may be in a range of 15 $m^2$/g to 45 $m^2$/g (23.88 $m^2$/g), and/or a first average pore diameter of the nanocomposite, according to (Barrett-Joyner-Halenda) BJH measurement method, may be in a range of 6.3 to 10.03 nanometers (nm) (8.3 nm), and/or an average pore volume of the nanocomposite, according to the BJH measurement method, may be in a range of from 0.06 $cm^3$/g to 0.12 $cm^3$/g (0.09 $cm^3$/g).

The nanocomposite may have a (311) spinel interplanar spacing in a interplanar spacing in a range of from 0.210 to 0.290 nm (0.25 nm), a (006) $Fe_2O_3$ interplanar spacing in a range of from 0.180 to 0.260 nm (0.22 nm), a (400) spinel interplanar spacing in a range of from 0.140 to 0.220 nm (0.18 nm), a (220) MgO interplanar spacing in a range of from 0.108 to 0.188 (0.148 nm), a (620) spinel interplanar spacing in a range of from 0.090 to 0.170 (0.13 nm), and a (119) $Fe_2O_3$ and (622) $Fe_2O_3$ spinel interplanar spacing in a range of from 0.080 to 0.160 (0.12 nm), according to selected area diffraction (SAED).

The mass relationship of the nanocomposite may be in a range of from 9 to 11:4 to 6:84 to 86, the nanocomposite has a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and a (119) $Fe_2O_3$ and (622) $Fe_2O_3$ spinel interplanar spacing of 0.12±2% nm, an XRD spectrum of the nanocomposite under Cu-filtered Cu-Kα radiation (1.5418 Å) powered at 45 kV and 10 mA has 2θ peaks of an $MgAl_2O_4$ spinel phase at 18.9±1°, 31.7±1°, 44.8±1°, 56.2±1°, 74.09±1°, and 78.1±1°, an MgO cubic phase at 42.8±1, 62.2±1, and 74.6±1°, an $Fe_2O_3$ hexagonal phase at 36.9±1°, 44.8±1°, 59.6±1°, and 67.3±1°, and g-$C_3N_4$-related diffractions at 27.8±1°, 36.8±1°, 44.6±1°, and 67.3±1°, and no more than 1% relative intensity $MgFe_2O_4$ (none) is detected in the XRD spectrum.

The magnesium salt may include $Mg(NO_3)_2$, the aluminum salt may include $Al(NO_3)_3$, the ferric salt may include ferric nitrate. The heating the first mixture may obtain a first solid with at least 90, 92.5, 95, 96, 97, 98, 99, 99.9, 99.99, or 99.999 wt. % of the aqueous solvent removed (or all detectable solvent/water). The calcining the first powder may be at a temperature in a range of from 675° C. to 725° C. for a time in a range of from 2.75 to 3.25 hours. The heating of the second powder may be at a temperature in a range of from 590° C. to 610° C. for a time in a range of 55 minutes to 1.1 hours.

The nanocomposite may include no more than 1 wt. % of $Mg_{0.7}Fe_{0.23}Al_{1.97}O_4$ and $Fe_{1.84}Mg_{5.6}Al_{15.77}O_{32}$, relative to a total metal oxide weight.

The grinding the first solid may avoid or not include ball milling.

The nanocomposite may include no more than 1 wt. % $SiO_2$, relative to a total metal oxide weight.

The carbon materials in the nanocomposite may include no more than 1 wt. % carbon nanotubes, relative to total nanocomposite weight.

The nanocomposite may be made without hot-pressing.

The nanocomposite may include no more than 1 wt. % Co, relative to total nanocomposite weight.

The nanocomposite may include no more than 1 wt. % elemental state metal, relative to total nanocomposite weight.

The nanocomposite may include no more than 1 wt. % elemental state Co, relative to total nanocomposite weight.

The nanocomposite may include no more than 1 wt. % elemental state Fe, relative to total nanocomposite weight.

The nanocomposite may include no more than 10 wt. % MgO, relative to a total metal oxide weight.

The nanocomposite obtained may include no more than 1 wt. % carbonaceous material besides the graphitic carbon nitride.

In some embodiments, carbon materials in the nanocomposite include no nanotubes, relative to total nanocomposite weight.

The nanocomposite may include no more than 1 wt. % $Al_2O_3$, relative to a total metal oxide weight.

The graphitic $C_3N_4$ in the nanocomposite may consist essentially of sheet morphologies.

The urea may not contact the aluminum and/or magnesium salt, prior to the formation of the $MgAl_2O_4$.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
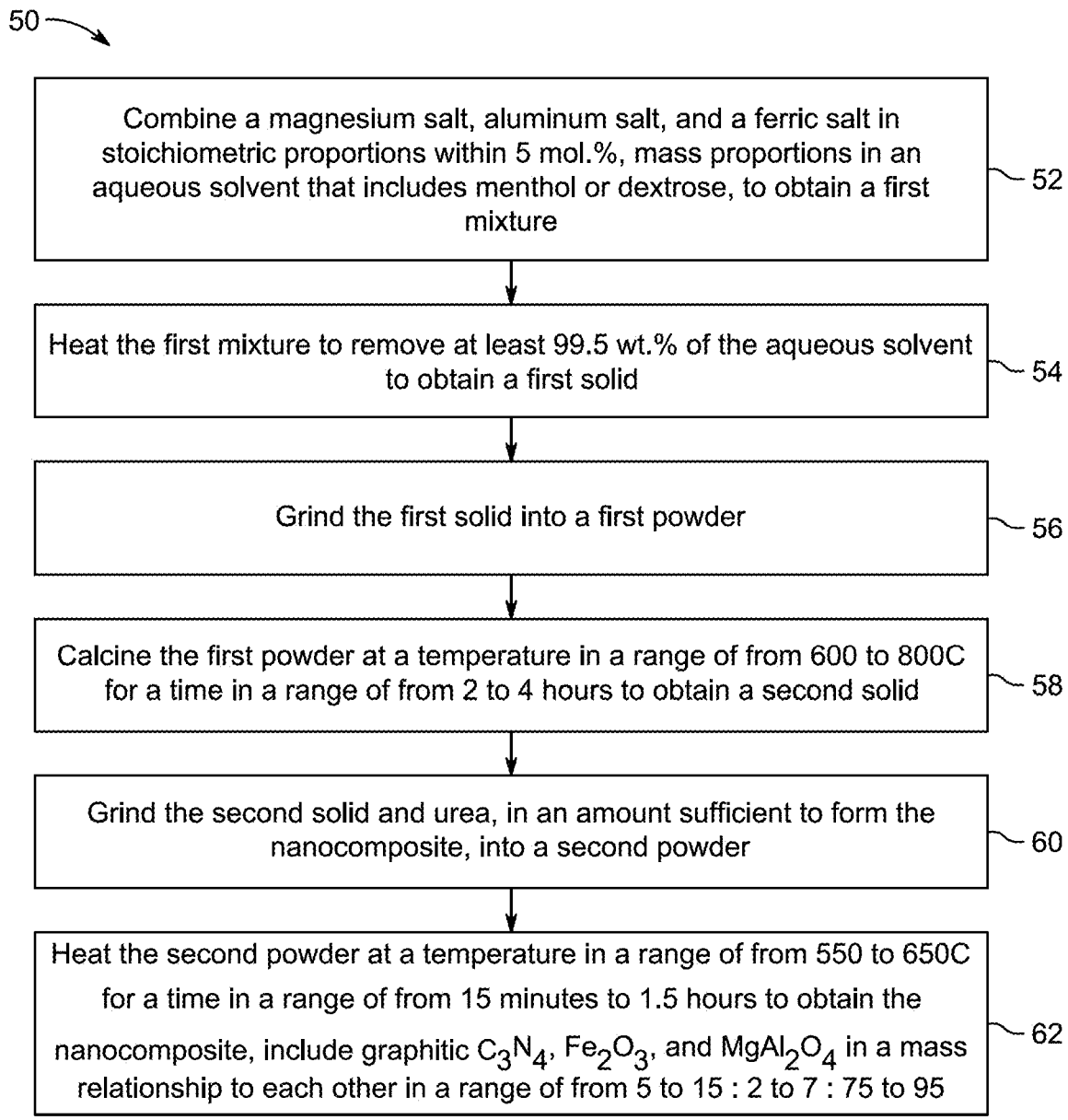
FIG. 1 is an exemplary flow chart of a method of manufacturing a nanocomposite, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present invention.

As used herein, the term 'nanocomposite' refers to a composite material that has at least one component with a grain size measured in nanometers.

As used herein, the term 'nanohybrid composite' refers to a material that combines nanomaterials (such as nanoparticles, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are superior to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is an important parameter in characterizing the porous structure of materials, such as adsorbents or catalysts. As used herein, the term 'photodegradation' refers to the process by which a material undergoes chemical breakdown or alteration due to exposure to light. This process typically results in the breaking of molecular bonds within the material, leading to the formation of new compounds or the degradation of its physical and chemical properties.

As used herein, the term 'bimodal' refers to a distribution or pattern characterized by the presence of two distinct peaks or modes. In the context of particle size or material properties, it indicates that the sample include of particles or components that are predominantly of two different sizes or characteristics, with a noticeable division between the two modes.

As used herein, the term 'spinel interplanar spacing' refers to the distance between parallel planes of atoms in the crystal structure of a spinel material. Spinel is a type of mineral with a specific crystalline arrangement, represented by the general formula $AB_2O_4$, where 'A' and 'B' are metal ions. The interplanar spacing is crucial for understanding the material's structural properties and is typically measured using X-ray diffraction (XRD) techniques.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%, except as otherwise indicated.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'carbon materials' refers to a broad category of materials primarily composed of carbon atoms, including but not limited to carbon-based substances such as graphite, graphene, activated carbon, carbon black, and carbon composites. These materials can exist in various forms and structures, from amorphous to crystalline, and may be used in a wide range of applications, including energy storage, catalysis, and filtration.

Aspects of the present disclosure is directed to a method of forming a nanocomposite of graphitic carbon nitride (g-$C_3N_4$), iron oxide ($Fe_2O_3$), and magnesium aluminate ($MgAl_2O_4$) ($C_3N_4@Fe_2O_3/MgAl_2O_4$). Each component of the nanocomposite, when used in appropriate ratios, is effective in the photodegradation of organic contaminants in water with high efficiency and photodegradation activity.

A nanocomposite (g-$C_3N_4@Fe_2O_3/MgAl_2O_4$) including g-$C_3N_4$, $Fe_2O_3$ and $MgAl_2O_4$ is described. The nanocomposite may include coating of g-$C_3N_4$ on $Fe_2O_3$ and $MgAl_2O_4$. The g-$C_3N_4$, $Fe_2O_3$, and $MgAl_2O_4$ are present in the nanocomposite in a mass relationship to each other in a range of from 5 to 15:2 to 7:75 to 95, preferably 7 to 13:3 to 6:80 to 90, and preferably 9 to 11:4 to 5:84 to 86. The g-$C_3N_4$, $Fe_2O_3$, and $MgAl_2O_4$ may be present in the nanocomposite in a mass relationship to each other of 10:5:85, while tolerable variations of any of these values may be ±2.5, 2, 1.5, 1, 0.75, 0.5, 0.25, 0.1, 0.5, or 0.1. The nanocomposite may exhibit excellent performance in photodegradation of organic pollutants, hydrogen generation, and/or anticancer activity.

The nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm, e.g., in a range with an upper limit of 2, 1, 0.9, 0.75, 0.5, 0.25, 0.1, 0.05, or 0.01 nm, and/or a lower limit of 0.00001, 0.0001, 0.001, 0.01, 0.1, 0.25, 0.5, 0.75, or 1 nm. The term 'mesoporous' means the pores of the nanocomposite have an average pore width of 2 to 50 nm, though this may include subranges within this general range, e.g., a minimum diameter of 2, 3, 5, 10, 15, 20, 25, or 35 m, and/or a maximum diameter of 50, 45, 40, 35, 30, 25, 20, 15, or 10 nm. The term 'macroporous' means the pores of nanocomposite have an average pore width larger than 50 nm, e.g., at least 55, 75, 100, 250, 500, 750, or 1000 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

The Brunauer-Emmett-Teller (BET) specific surface area of the nanocomposite may range from 15 to 45 square meters per gram ($m^2/g$), preferably 16 to 43 $m^2/g$, preferably 18 to 40 $m^2/g$, preferably 22 to 30 and preferably 23 to 24 $m^2/g$. The surface area of the nanocomposite is 23.88±5, 4, 3, 2.5, 2, 1.5, 1, 0.75, 0.5, 0.25, 0.2, or 0.1 $m^2/g$. The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. The pore diameter, pore volume, and/or BET surface area may be measured by gas adsorption analysis, preferably $N_2$ adsorption analysis (e.g., $N_2$ adsorption isotherms).

The average pore distribution of the nanocomposite may include, but is not limited to, crystalline average pore distribution, unimodal, trimodal, multimodal, narrow, broad and gaussian. The average pore distribution of the nanocomposite may be bimodal, indicating the presence of two distinct pore sizes within the material. This bimodal pore structure suggests that the nanocomposite contains both smaller and larger pores, which may contribute to enhanced properties such as improved surface area, increased mechanical strength, or enhanced porosity for specific applications.

The first average pore diameter of the first mode of the nanocomposite, according to Barrett-Joyner-Halenda (BJH) measurement method, may be in a range of from 6.3 to 10.03 nm preferably 6.5 to 9.5 nm, preferably 7.5 to 9 nm, preferably 7 to 9 nm and preferably 8 to 8.5 nm, and a second average pore diameter of the second mode of the nanocomposite, according to BJH measurement method, being in a range of from 7.5 to 13 nm, preferably 8 to 13 nm, preferably 9 to 12.5 nm, preferably 9.5 to 11 nm, and preferably 10 to 11 nm. The first average pore diameter of the first mode of the nanocomposite may be 8.3±1.5, 1, 0.75, 0.67, 0.5, 0.33, 0.25, 0.125, 0.1, 0.05, or 0.01 nm and the second average pore diameter of the second mode of the nanocomposite is 10.87±2, 1.5, 1, 0.75, 0.67, 0.5, 0.33, 0.25, 0.125, 0.1, 0.05, or 0.01 nm.

The average pore volume of the nanocomposite, according to the BJH measurement method is in range of from 0.06 to 0.12 cubic centimeters per gram ($cm^3/g$) preferably 0.07 to 0.11 $cm^3/g$ and preferably 0.08 to 0.10 $cm^3/g$. The average pore volume of nanocomposite may be 0.09±0.025, 0.01, 0.005, or 0.001 $cm^3/g$.

The nanocomposite has a (311) spinel interplanar spacing in a range of from 0.210 to 0.290 nm preferably 0.220 to 0.285 nm, preferably 0.235 to 0.270 nm, preferably 0.24 to 0.26 nm, according to selected area diffraction. The nanocomposite has a (006) $Fe_2O_3$ interplanar spacing in a range of from 0.180 to 0.260 nm preferably 0.190 to 0.260 nm, preferably 0.20 to 0.25 nm, preferably 0.21 to 0.24 nm, and preferably 0.21 to 0.23 nm, according to selected area diffraction. The nanocomposite has a (400) spinel interplanar spacing in a range of from 0.140 to 0.220 nm, preferably 0.150 to 0.220 nm, preferably 0.165 to 0.21 nm, preferably 0.17 to 0.20 nm and preferably 0.17 to 0.21 nm, according to selected area diffraction. The nanocomposite has a (220) MgO interplanar spacing in a range of from 0.108 to 0.188 nm preferably 0.110 to 0.187 nm, preferably 0.125 to 0.170 nm, preferably 0.130 to 0.180 nm and preferably 0.140 to 0.150 nm, according to selected area diffraction. The nanocomposite has a (620) spinel interplanar spacing in a range of from 0.090 to 0.170, preferably 0.100 to 0.170 nm, preferably 0.115 to 0.165 nm and preferably 0.125 to 0.150 nm, according to selected area diffraction. The nanocomposite has a (119) $Fe_2O_3$ and (622) $Fe_2O_3$ spinel interplanar spacing in a range of from 0.080 to 0.160, preferably 0.090 to 0.160 nm, preferably 0.100 to 0.150 nm, and preferably 0.110 to 0.130 nm, according to selected area diffraction.

The nanocomposite may have a (311) spinel interplanar spacing of 0.25 nm, a (006) $Fe_2O_3$ interplanar spacing of 0.22 nm, a (400) spinel interplanar spacing of 0.18 nm, a (220) MgO interplanar spacing of 0.148 nm, a (620) spinel interplanar spacing of 0.13 nm, and/or a (119) $Fe_2O_3$ and a (622) $Fe_2O_3$ spinel interplanar spacing of 0.120 nm, according to selected area diffraction.

The mass relationship of the nanocomposite may be in the range of from 9 to 11:4 to 6:84 to 86 and preferably 9.5 to 10.5:4.5 to 5.5:84.5 to 85.5. The mass relationship of the nanocomposite may be 10:5:85.

The nanocomposite may have a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and/or a (119) $Fe_2O_3$ and (622) $Fe_2O_3$ spinel interplanar spacing of 0.12±2% nm, according to selected area diffraction.

The XRD spectrum of the nanocomposite may show that the nanocomposite is crystalline and/or exhibit a $MnO_2$ phase, a iron oxide ($Fe_2O_3$) phase, a magnesium aluminium oxide ($MgAl_2O_4$) phase, an $Al_2O_3$ phase, and a graphite-phase carbon nitride ($g-C_3N_4$) phase.

In some embodiments, MgO may exist in various phases like cubic, hexagonal, and puckered layers, although predominantly, it exists in cubic phase. $Fe_2O_3$ may exist in various crystalline phases/polymorphic forms like α-, β-, γ-, ε-, or mixtures thereof. Graphitic carbon nitride ($g-C_3N_4$) exists in several crystalline phases, including α (alpha), β (beta), γ (gamma), and other less-common phases, or mixtures thereof.

$MgAl_2O_4$ may have a spinel phase. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal." Conversely, when tetrahedral sites are occupied by half of the $B^{3+}$ and octahedral sites by the other half along with $A^{2+}$, the spinel phase is termed "inverse." The spinel phase with the chemical formula $MgAl_2O_4$ is a mineral type of this oxide family. $MgAl_2O_4$ has been widely used in various applications, such as in metallurgical, electrochemical, radio-technical, and chemical industrial fields owing to its high thermal stability (melting point at 2135° C., high hardness (16 gigapascal (GPa)), high mechanical resistance, high resistance against chemical attack, wide band gap energy, high electrical resistivity, relatively low thermal expansion coefficient ($9.10^{-6}$ 1/° C.) between 3° and 1400° C., low dielectric constant, low density (3.58 gram per cubic centimeter ($g/cm^3$)), high thermal shock resistance, hydrophobicity, and low surface acidity.

The XRD spectrum of the nanocomposite under Cu-filtered CuKα radiation (1.5418 Å) powered at 45 kilovolt (kV) and 10 milliampere (mA) may have 2θ peaks of an $MgAl_2O_4$ spinel phase at 18.9±1, 31.7±1, 44.8±1, 56.2±1, 74.09±1, and/or 78.1±1°. The $MgAl_2O_4$ spinel diffractions are recorded at 2θ values of 18.9, 31.7, 44.8, 56.2, 74.09, and/or 78.1° with diffractions originating from the (111), (220), (400), (422), (620), and (622) planes, respectively. The XRD spectrum of the nanocomposite under Cu-filtered Cu-Kα radiation (1.5418 Å) powered at 45 kilovolt (kV) and 10 milliampere (mA) has 2θ peaks of MgO cubic phase at 2.8±1, 62.2±1, and/or 74.6±1°. The MgO (COD card, No. 9000499) may show cubic phase at 2θ values of 42.8, 62.2, and/or 74.6° originating from (200), (220), and (311) planes, respectively. The XRD spectrum of the nanocomposite under Cu-filtered Cu-Kα radiation (1.5418 Å) powered at 45 kilovolt (kV) and 10 milliampere (mA) has 2θ peaks of $Fe_2O_3$ hexagonal phases at 36.9±1, 44.8±1, 59.6±1, and/or 67.3±1°. The hexagonal phase of $Fe_2O_3$ (COD No. 1532120) may be closely matched with the diffraction lines seen at 36.9, 44.8, 59.6, and/or 67.3°; $g-C_3N_4$-related diffractions at 27.8±1, 36.8±1, 44.6±1, and/or 67.3±1°. The $g-C_3N_4$-related diffractions may be detected at 27.8, 36.8, 44.6, and/or 67.3° (COD No. 1534042).

No more than 1%, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably 0.3 wt. %, preferably 0.2 wt. %, preferably no more than 0.1 wt. %, preferably no more than 0.09 wt. %, preferably no more than 0.07 wt. %, preferably no more than 0.05 wt. %, preferably no more than 0.03 wt. %, preferably no more than 0.01 wt. % relative intensity $MgFe_2O_4$ (none) may be detected in the XRD spectrum, ensuring that the nanocomposite maintains a high level of purity. The minimal presence of $MgFe_2O_4$ (less than 1, 0.5, 0.1, 0.01, 0.001, 0.0001, or 0.00001%) in the nanocomposite may be helpful in maintaining its enhanced catalytic properties, high surface reactivity, and efficient adsorption. This may ensure desired performance in environmental remediation, energy production, and biomedical applications, free from interference by less reactive $MgFe_2O_4$ phases.

The nanocomposite may include no more than 1 wt. %, preferably less than 0.9 wt. %, preferably less than 0.8 wt. %, preferably 0.7 wt. %, preferably less than 0.6 wt. %, preferably 0.5 wt. %, preferably 0.4 wt. %, preferably less than 0.3 wt. %, preferably less than 0.2 wt. %, preferably less than 0.1 wt. % of $Mg_{0.7}Fe_{0.23}Al_{1.97}O_4$ and $Fe_{1.84}Mg_{5.6}Al_{15.77}O_{32}$, relative to a total metal oxide weight.

The nanocomposite may include no more than 1 wt. % $SiO_2$, preferably less than 0.9 wt. % of $SiO_2$, preferably less than 0.8 wt. % of $SiO_2$, preferably less than 0.7 wt. % of $SiO_2$, preferably less than 0.6 wt. % of $SiO_2$, preferably less than 0.5 wt. % of $SiO_2$, preferably less than 0.4 wt. % of $SiO_2$, preferably less than 0.3 wt. % of $SiO_2$, preferably less than 0.2 wt. % of $SiO_2$, and preferably less than 0.1 wt. % $SiO_2$ relative to a total metal oxide weight.

The nanocomposite may include no more than 10 wt. % MgO, preferably less than 9 wt. % of MgO, preferably less than 8 wt. % of MgO, preferably less than 7 wt. % of MgO, preferably less than 6 wt. % of MgO, preferably less than 5 wt. % of MgO, preferably less than 4 wt. % of MgO, preferably less than 3 wt. % of MgO, preferably less than 2 wt. % of MgO, and preferably less than 1 wt. % relative to a total metal oxide weight.

The nanocomposite may include no more than 1% wt. % $Al_2O_3$, preferably less than 0.9 wt. %, preferably less than 0.8 wt. %, preferably 0.7 wt. %, preferably less than 0.6 wt. %, preferably 0.5 wt. %, preferably 0.4 wt. %, preferably less than 0.3 wt. %, preferably less than 0.2 wt. %, preferably less than 0.1 wt. %, relative to a total metal oxide weight. The minimal presence of $Al_2O_3$ (less than 1%) in the nanocomposite is critical to maintaining its enhanced catalytic properties, high surface reactivity, and efficient adsorption. This ensures desired performance in environmental remediation, energy production, and biomedical applications, free from interference by less reactive $Al_2O_3$ phases.

The nanocomposite may include no more than 1 wt. %, preferably less than 0.9 wt. %, preferably less than 0.8 wt. %, preferably 0.7 wt. %, preferably less than 0.6 wt. %, preferably 0.5 wt. %, preferably 0.4 wt. %, preferably less than 0.3 wt. %, preferably less than 0.2 wt. %, preferably less than 0.1 wt. % of carbonaceous material besides the graphitic carbon nitride. A low concentration of carbonaceous material contributes to maintaining the desired structural integrity and functional properties of the nanocomposite. The minimal amount of additional carbon material prevents any significant interference with the performance of the graphitic carbon nitride, particularly in applications such as photocatalysis or energy storage, where the purity and specific properties of the $g-C_3N_4$ are crucial.

The graphitic $C_3N_4$ in the nanocomposite may consist essentially of sheet morphologies, i.e., such that the BET specific surface error is within 5% of a pure nanosheet material. Other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nanourchins, nanoflowers, nanostars, tetrapods, and their mixtures thereof are also possible.

The carbon materials in the nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, individually or together, of carbon nanotubes or/and carbon dots, relative to total nanocomposite weight. The carbon materials in the nanocomposite may include no nanotubes relative to total nanocomposite weight, or no added nanotubes.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. % elemental state metal, relative to total nanocomposite weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. % elemental state Co, relative to total nanocomposite weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. % Co, relative to total nanocomposite weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. % elemental state Fe, relative to total nanocomposite weight.

FIG. 1 illustrates a schematic flow chart of a method 50 of manufacturing the $g-C_3N_4@Fe_2O_3/MgAl_2O_4$ nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 may include combining a magnesium salt, aluminum salt, and a ferric salt in stoichiometric proportions within 5 mole percent (mol. %) in an aqueous solvent including menthol or dextrose, to obtain a first mixture. The magnesium salt may include, but is not limited to, magnesium chloride, magnesium sulfate, magnesium carbonate, magnesium oxide, magnesium fluoride, magnesium bromide, magnesium iodide, magnesium hydroxide, magnesium citrate, magnesium malate, magnesium lactate, magnesium gluconate, magnesium ascorbate, magnesium tartrate, magnesium perchlorate, magnesium phosphate, magnesium stearate, magnesium pyrophosphate, magnesium silicate, magnesium borate, magnesium nitrate, magnesium formate, magnesium acetate, magnesium hypophosphite, magnesium tungstate, magnesium thiosulfate, magnesium nitride, magnesium aluminate, magnesium succinate, and/or mixtures thereof. The magnesium salt in the combining may include magnesium nitrate ($Mg(NO_3)_2$).

The aluminum salts may include, but are not limited to, aluminum nitrate, aluminum chloride, aluminium nitrate, aluminum sulfate, aluminum acetate, and/or mixtures thereof. The aluminium salt is aluminium nitrate ($Al(NO_3)_3$). The ferric salt may include, but is not limited to, ferric chloride, ferric sulfate, ferric acetate, ferric nitrate, ferric phosphate, ferric oxalate, and/or mixtures thereof. The ferric salt is ferric nitrate ($Fe(NO_3)_3$).

Other carbon sources apart from dextrose or menthol, such as sucrose, fructose, glucose, maltose, dextrose, corn syrup, lactose, glycerol, mannitol, sorbitol, menthol, and cellulose, or combinations thereof, can also or alternatively be used.

At step 54, the method 50 may include heating the first mixture to remove the aqueous solvent to obtain a first solid. The heating of the first mixture removes the aqueous solvent such that the first solid is a solid that can be ground to a powder without further solvent removal. An aqueous solvent is a solvent in which water serves as the primary medium for dissolving other substances. Water is considered a polar solvent, which enables it to dissolve a wide variety of ionic and polar compounds. Water may be tap water, distilled water, double-distilled water, deionized water, deionized distilled water, reverse osmosis water, and/or some other water. Examples of aqueous solvents include water itself, as well as solutions like sodium chloride solution, acetic acid solution, ethanol solution, hydrochloric acid solution, sodium hydroxide solution, ammonia solution, hydrogen peroxide solution, and sodium bicarbonate solution. Other examples include potassium permanganate solution, citric acid solution, potassium chloride solution, glycerol solution, urea solution, calcium chloride solution, magnesium sulfate solution, sodium acetate solution, formic acid solution, and sodium nitrate solution. The aqueous solvent may include menthol or dextrose.

The heating may be performed by using heating appliances such as ovens, microwaves, autoclaves, hot plates, heating mantles and tapes, oil baths, salt baths, sand baths, air baths, hot-tube furnaces, and hot-air guns. The heating of the first mixture may remove at least 99.5, 99.9, 99.99, or 99.999 wt. % of the aqueous solvent (or all detectable solvent/water) to obtain the first solid. Heating the first mixture may obtain the first solid with at least 99.9 wt. % of the aqueous solvent removed.

At step 56, the method 50 may include grinding the first solid into a first powder. The first solid is grounded into a powder form by any suitable method, such as using a mortar and pestle, mechanical grinding. The method of grinding of the first solid may does not require ball milling or other forms of milling. Alternative grinding methods that may reduce contamination, improve particle size control, increase energy efficiency, and preserve material integrity are preferred.

At step 58, the method 50 may include calcining the first powder at a temperature in a range of from 600 to 800° C. for a time in a range of from 2 to 4 hours (h) to obtain a second solid. The calcination of the precipitate may be carried out by heating it to a high temperature, under a restricted supply of ambient oxygen. This may be performed to remove impurities or volatile substances and to incur thermal decomposition. Typically, the calcination may be carried out in a furnace, preferably equipped with a temperature control system, which may provide a heating rate of up to 50° C. per minute (° C./min), preferably up to 40° C./min, preferably up to 30° C./min, preferably up to 20° C./min, preferably up to 10° C./min, preferably up to 5° C./min, preferably up to 2° C./min, and preferably up to 1° C./min.

The powder may be calcined at a range of from 600 to 800° C., preferably 610 to 790° C., preferably 620 to 780° C., preferably 630 to 770° C., preferably 640 to 760° C., preferably 650 to 750° C., preferably 660 to 740° C., preferably 670 to 730° C., preferably 680 to 720° C., and preferably 690 to 710° C. for a time in a range of from 2 to 4 h, 2.5 to 3.5 h, and preferably 2.75 to 3.25 h, to obtain a second solid. The powder may be calcined at a range of from 675 to 725° C., preferably 680 to 720° C., preferably 685 to 715° C., preferably 690 to 710° C., preferably 695 to 705° C. for a time in a range of from 2.75 to 3.25 h, preferably 2.8 to 3.2 h, and preferably 2.9 to 3.1 h. The powder may be calcined at 700° C. for 3 h.

At step 60, the method 50 may include grinding the second solid and urea, in an amount sufficient to form the nanocomposite, into a second powder. The amount of urea may be in the range of about 1 to 10 wt. %, relative to the total weight of the materials involved in the formation of the nanocomposite. In other embodiments, the amount of urea may be between 3 and 5 wt. % to achieve the desired properties. The urea does not contact the aluminum and/or magnesium salt, prior to the formation of the $MgAl_2O_4$, thereby preventing premature reactions that may interfere with the desired formation of $MgAl_2O_4$ and ensuring the controlled development of the nanocomposite's structure and properties.

At step 62, the method 50 may include heating the second powder in a range of from 550 to 650° C. for a time period of 15 min (0.25 h) to 1.5 h to obtain the nanocomposite, including graphitic $C_3N_4$, $Fe_2O_3$, and $MgAl_2O_4$ in a mass relationship to each other in a range of from 5 to 15:2 to 7:75 to 95. The heating temperature may range from 550 to 650° C., preferably 560 to 640° C., preferably 570 to 630° C., preferably 580 to 620° C., preferably 590 to 610° C., and yet more preferably 600° C. for a time in a range of from 15 min (0.25 h) to 1.5 h, preferably 0.3 h to 1.4 h, preferably 0.4 h to 1.3 h, preferably 0.5 h to 1.2 h, preferably 0.6 h to 1.1 h, preferably 0.7 h to 1.0 h, and preferably 0.8 h to 0.9 h to obtain the nanocomposite, including graphitic $C_3N_4$, $Fe_2O_3$, and $MgAl_2O_4$ in a mass relationship to each other in a range of from 5 to 15:2 to 7:75 to 95, preferably 7 to 13:3 to 6:80 to 90, and preferably 9 to 11:4 to 5:84 to 86. The method of heating the second powder is at a temperature in a range of from 590 to 610° C., preferably 592 to 608° C., preferably 594 to 606° C., preferably 596 to 604° C., and preferably 598 to 602° C. for a time in a range of 55 min to 1.1 h, and preferably 1 h. The method may include heating the second powder at 600° C. for 1 h to obtain the nanocomposite, including graphitic $C_3N_4$, $Fe_2O_3$, and $MgAl_2O_4$ in a mass relationship of 10:5:85. The second powder may be heated by using heating appliances such as hot plates, furnace, heating mantles ovens, microwaves, autoclaves, tapes, oil baths, salt baths, sand baths, air baths, hot-tube furnaces, and hot-air guns. The second powder is heated in a furnace in a crucible.

The nanocomposite is not required to be made by hot-pressing, thereby enabling the use of alternative processing methods that may offer cost efficiencies, enhanced control over material properties, and the preservation of temperature-sensitive components.

EXAMPLES

The following examples demonstrate a method of manufacturing a nanocomposite. The examples are provided solely for illustration and are not to be construed as limitations of the present disclosure, as many variations thereof are possible without departing from the spirit and scope of the present disclosure.

Example 1: Fabrication of g-$C_3N_4$@$Fe_2O_3$/$MgAl_2O_4$ (10:5:85, Wt. %) Nanocomposite According to the present disclosure, magnesium nitrate, and aluminum nitrate were added together in one beaker with ferric nitrate, in a predetermined amount (here, stoichiometric), to produce a 10% $Fe_2O_3$/$MgAl_2O_4$ nanocomposite. Further, about 10 g of menthol, as a fuel, was added to the beaker, followed by 30 mL of distilled water. The beaker was heated till a clear solution was obtained and heated further till dryness. The product was ground in a mortar, transferred to a 150 mL porcelain dish, and calcined at 700° C. for 3.0 hours. Furthermore, the 10% $Fe_2O_3$/$MgAl_2O_4$ nanocomposite was cooled down to room temperature and weighed and further ground with urea in an amount suitable (here, 2 g urea to 20 g of the 10% $Fe_2O_3$/$MgAl_2O_4$ product, but depending upon the reaction conditions, this may be 5, 10, 15, 20, 25, 33, 50, 100, 150, 250, 500, or 1000 parts by weight of urea to 100 parts by weight of 10% $Fe_2O_3$/$MgAl_2O_4$, and optionally no more than 100,000, 50,000, 25,000, 10,000, 5,000, 1,000, 750, 500, 400, 333, 250, 125, 100, 75, 50, or 25 parts by weight urea to 100 parts) to produce g-$C_3N_4$@$Fe_2O_3$/$MgAl_2O_4$ in a weight ratio of about 10:5:85 wt. %. The quadruple mixture was returned, and heated to 600° C. for 1.0 h in a covered porcelain crucible, subsequently, the g-$C_3N_4$@$Fe_2O_3$/$MgAl_2O_4$ (10:5:85, wt. %) nanocomposite was collected.

Example 2: Characterization

X-ray diffraction XRD was used to identify the crystalline states in each specimen, employing the JDX-8030 X-ray, JEOL, made in Japan. Cu-filtered Cu-Kα radiation (1.5418 Å) powered at 45 kV and 10 mA was used to run the patterns. The specimens were tested at ambient temperatures in a range of 2θ=5° to 80°. The surface morphologies of the obtained samples were analyzed using images of transmission electron microscopy (TEM), selected area electron diffraction (SAED), and high-resolution transmission electron microscopy (HRTEM), obtained by a Tecnai-G20 (USA) transmission electron microscope with a 200 kV speed voltage. Nitrogen ($N_2$) adsorption isotherm obtained at 77 K using Micrometrics ASAP 2020. Further, Brunauer-Emmett-Teller (BET) analyzer was used to calculate the surface characteristics, specifically the BET surface area, total pore volume (Vp), and mean pore radius (r). Before beginning the measurement, the samples were outgassed for three hours at 200° C. with a decreased pressure of $10^{-5}$ Torr.

RESULTS AND DISCUSSION

Figure 2:
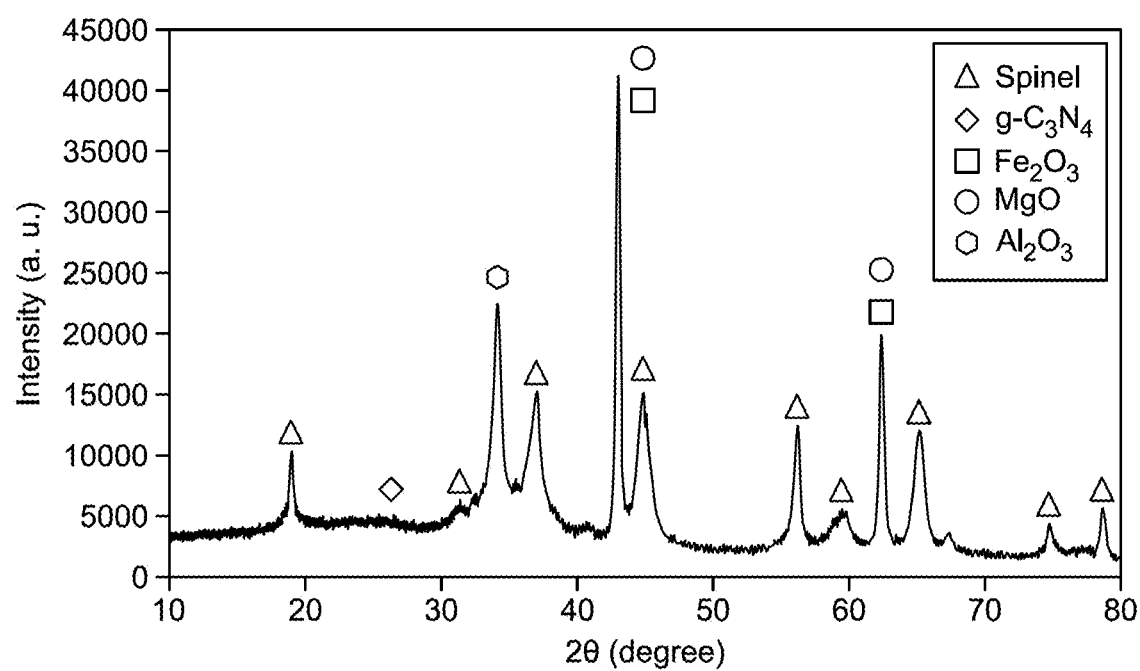
FIG. 2 is a graph depicting X-ray diffraction (XRD) patterns of an inventive 10% g-$C_3N_4$@$Fe_2O_3$/$MgAl_2O_4$ nanocomposite.

As mentioned above, XRD was used to examine the crystallinity and phase identification of the g-$C_3N_4$@$Fe_2O_3$/$MgAl_2O_4$ catalyst, the results are shown in FIG. 2. As can be seen from FIG. 2, the strong peaks indicate high crystalline nature of the powders. $Fe_2O_3$, MgO, $MgAl_2O_4$, and g-$C_3N_4$ phases were detected when the diffraction patterns match the typical JCPDS cards. $MgAl_2O_4$ spinel diffractions were recorded at 2θ values of 18.9°, 31.7°, 44.8°, 56.2°, 74.09°, and 78.1°. The standard COD card number 9001364 states that these diffractions originated from the (111), (220), (400), (422), (620), and (622) planes, respectively. MgO (COD card, No. 9000499) showed a cubic phase at 2θ values of 42.8°, 62.2°, and 74.6°. The (200), (220), and (311), respectively, are represented by the described lines. It has been previously observed that MgO is present along with the $MgAl_2O_4$ spinel phase. The hexagonal phase of $Fe_2O_3$ (COD No. 1532120) is closely matched with the diffraction lines observed at 36.9°, 44.8°, 59.6°, and 67.3°. The peak at 34.2° relate to $Al_2O_3$. g-$C_3N_4$-related diffractions were detected at 27.8°, 36.8°, 44.6°, and 67.3° (COD No. 1534042). g-$C_3N_4$@$Fe_2O_3$/$MgAl_2O_4$ was fabricated since no additional phase, such as $MgFe_2O_4$, were found. However, the computed lattice parameters for each phase were also determined and were as follows, a=8.07410 Å for spinel, a=4.83840 Å and c=12.61127 Å for $Fe_2O_3$, a=4.20729 Å for MgO, and a=6.84283 Å for g-$C_3N_4$.

Figure 3A:
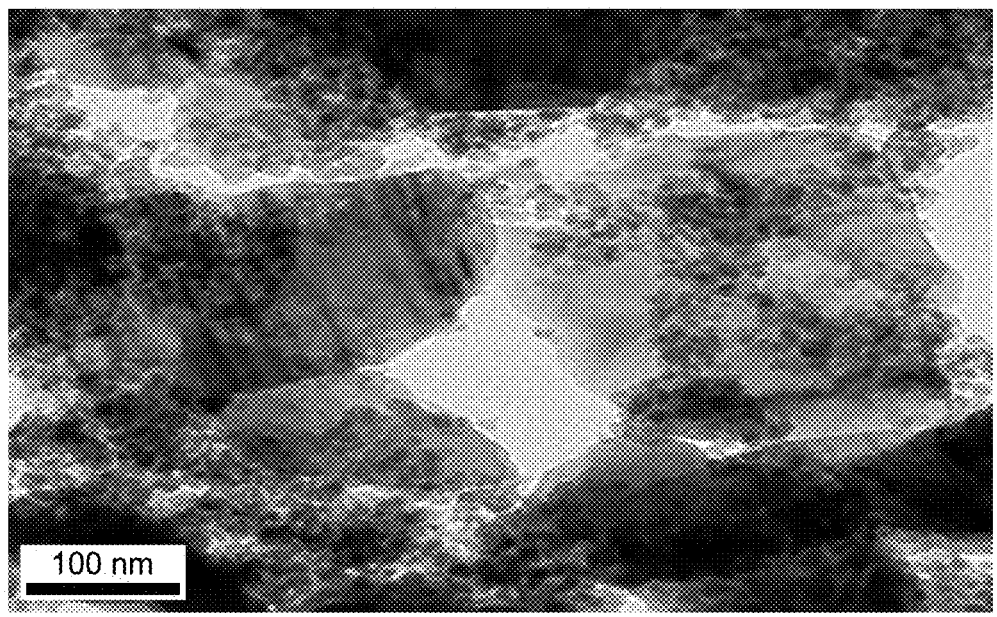
FIG. 3A is a transmission electron microscopy (TEM) image of an inventive 10% g-$C_3N_4$@$Fe_2O_3$/$MgAl_2O_4$ nanocomposite.
Figure 3B:
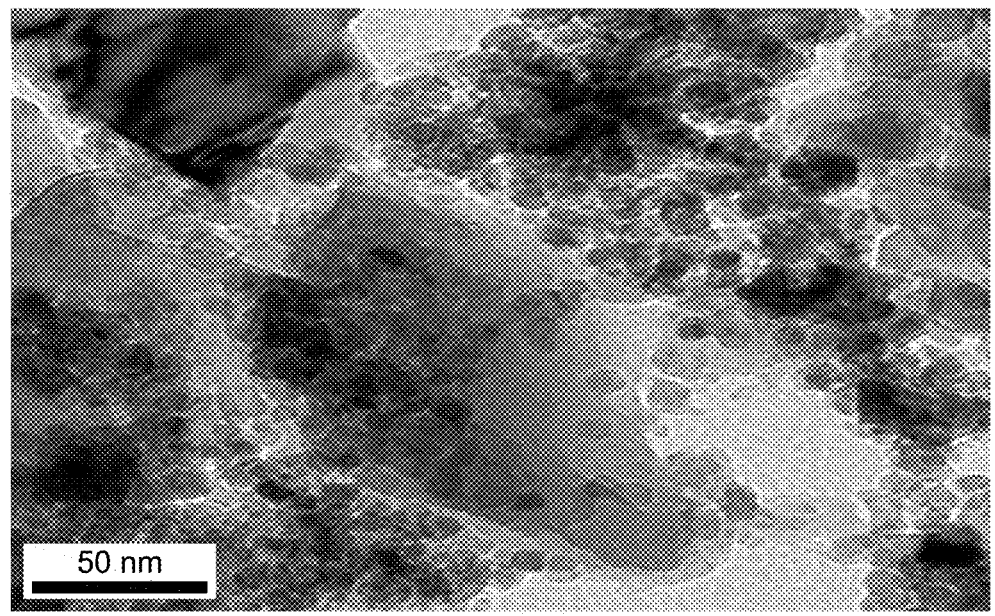
FIG. 3B is another TEM image of an inventive 10% g-$C_3N_4$@$Fe_2O_3$/$MgAl_2O_4$ nanocomposite.
Figure 3C:
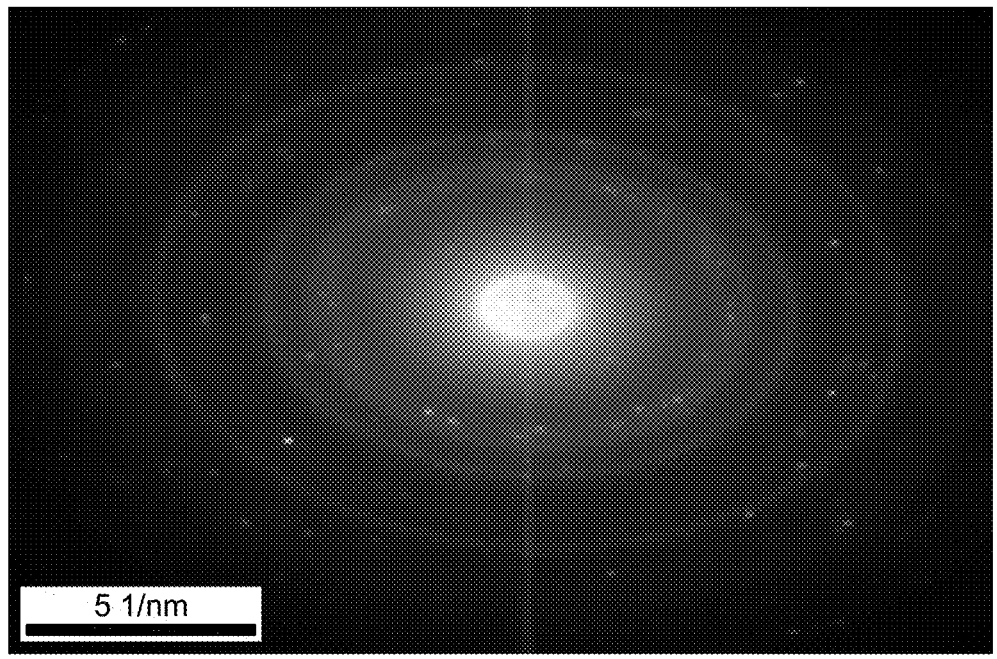
FIG. 3C is a selected area electron diffraction (SAED) pattern of an inventive 10% g-$C_3N_4$@$Fe_2O_3$/$MgAl_2O_4$ nanocomposite.
Figure 3D:
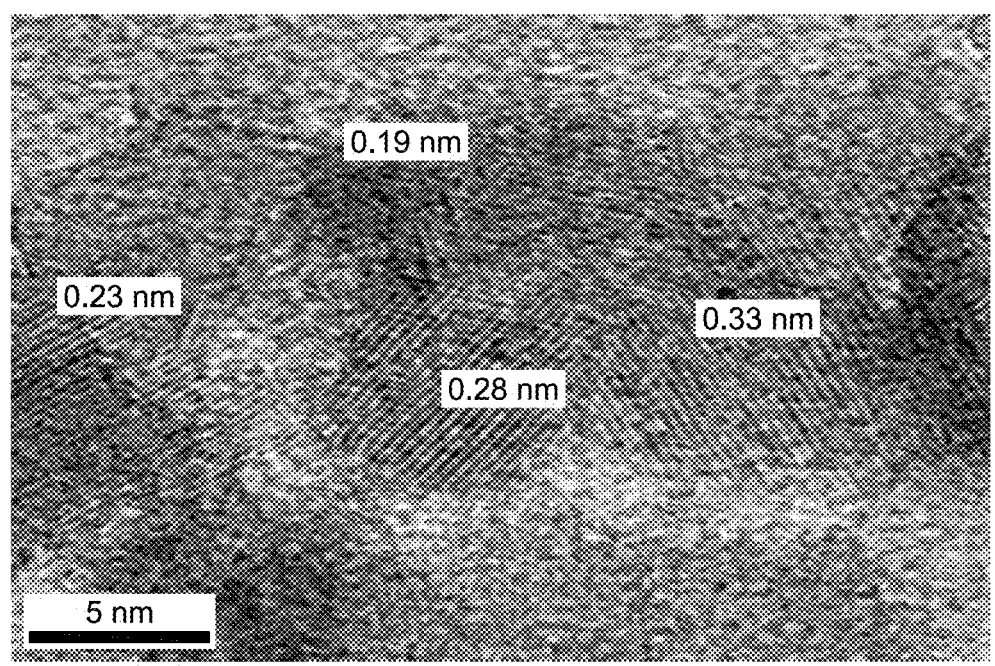
FIG. 3D is a high-resolution transmission electron microscopy (HRTEM) image of an inventive 10% g-$C_3N_4$@$Fe_2O_3$/$MgAl_2O_4$ nanocomposite.

Further, TEM images of g-$C_3N_4$@$Fe_2O_3$/$MgAl_2O_4$ nanocomposite are shown in FIGS. 3A-3B. The TEM images showed the dispersion of homogeneous spherical metal oxides nanoparticles with size of about 7 nm on two-dimensional porous structure constructed with curled nanosheets and platelets of the g-$C_3N_4$. The corresponding SAED pattern, as shown in FIG. 3C, reveals diffraction spots with interplanar spacing of 0.25 nm, 0.22 nm, 0.18 nm, 0.148 nm, 0.13 nm, and 0.12 nm due to (311, spinel), (006, $Fe_2O_3$), (400, spinel), (220, MgO), (620, spinel), and (119, $Fe_2O_3$, 622, spinel) diffraction planes, respectively. The corresponding HRTEM of the composite, as depicted in FIG. 3D, shows a plane spacing of 0.33 nm related to the (002) of CN, where 0.28 nm and 0.19 nm relates to (220), and (400) planes of spinel, and 0.24 nm relates to (110) plane of $Fe_2O_3$, characterizing the heterostructure formation.

Figure 4A:
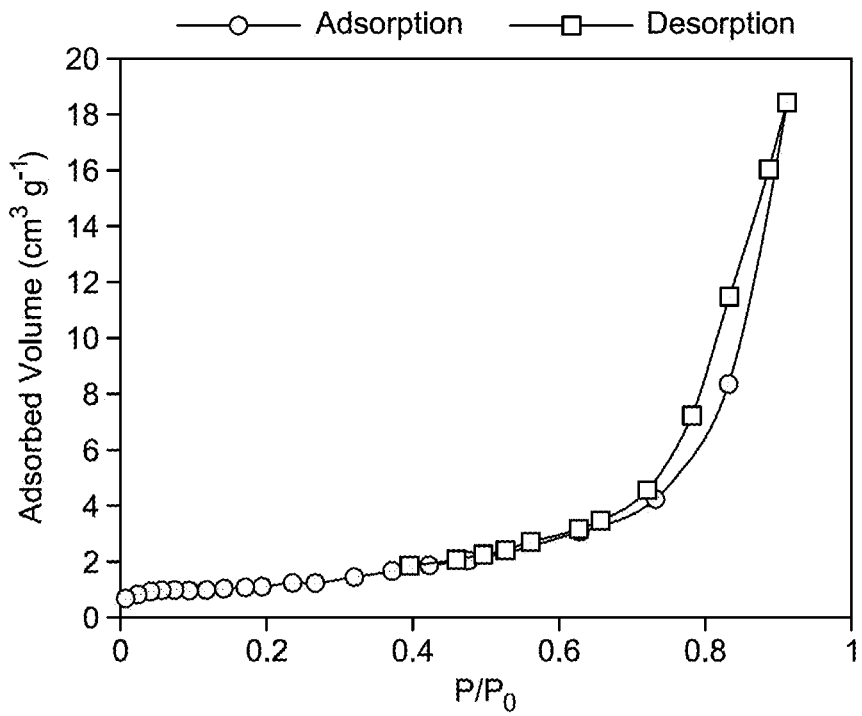
FIG. 4A is a graph depicting nitrogen adsorption-desorption isotherm of an inventive 10% g-$C_3N_4$@$Fe_2O_3$/$MgAl_2O_4$ nanocomposite.
Figure 4B:
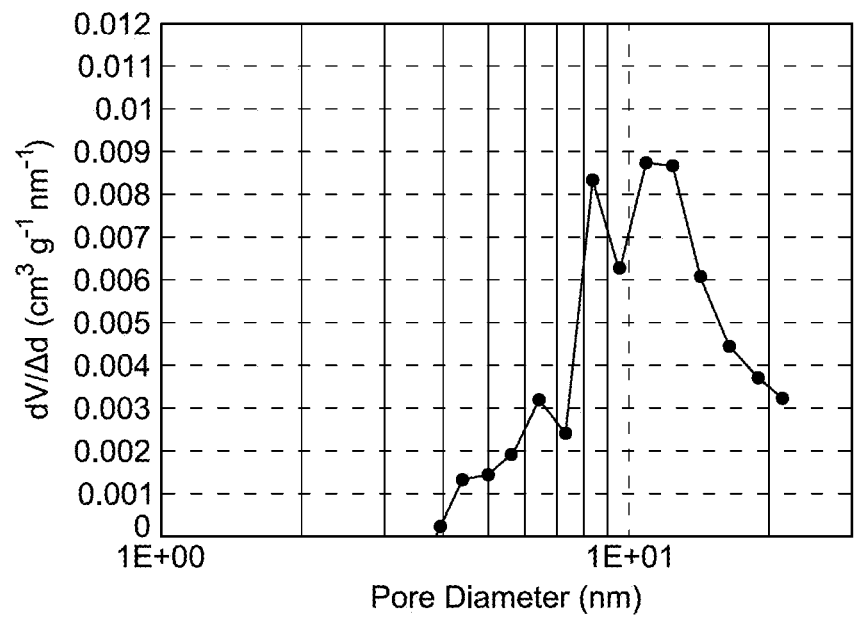
FIG. 4B is a graph depicting the pore size distribution of an inventive 10% g-$C_3N_4$@$Fe_2O_3$/$MgAl_2O_4$ nanocomposite.

According to the present disclosure, FIGS. 4A-4B display the $N_2$ adsorption-desorption isotherms of g-$C_3N_4$@$Fe_2O_3$/$MgAl_2O_4$ nanocomposite. The $N_2$ adsorption-desorption isotherm of the nanocomposite relates to type IV with clear hysteresis loop, indicating the formation of mesoporous structures. However, shifting the loop to a relatively higher pressure (P/P°=0.68 to 1) suggests an increase in the size of the mesopores, which may result from the well dispersion of metal oxides particles on the nanosheets of g-$C_3N_4$. Furthermore, the BET surface area of the g-$C_3N_4$@$Fe_2O_3$/$MgAl_2O_4$ sample was calculated to be about 23.88 $m^2$ $g^{-1}$. The marked high specific surface area reflects the good dispersion of the above-described metal oxide nanoparticles on g-$C_3N_4$. Moreover, the pore size distribution curves, plotted using the BJH method, for the g-$C_3N_4$@$Fe_2O_3$/$MgAl_2O_4$ sample exhibited bimodal distribution with average pore diameters maximized at 8.3 nm, and 10.89 nm in addition to pore volume of 0.09 $cm^3$ $g^{-1}$. All the isotherms relate to category H3 type of pores, which do not exhibit limiting adsorption at high P/P° and arise due to aggregation of plate-like particles giving rise to slit-shaped pores, indicating that the assembly of g-$C_3N_4$@$Fe_2O_3$/$MgAl_2O_4$ composite provoked a mesoporous array.

Numerous modifications and variations of the present disclosure are possible in light of the above teachings. It is therefore to be understood that within the scope of the appended claims, the invention may be practiced otherwise than as specifically described herein.

The invention claimed is:

1. A method of manufacturing a nanocomposite, the method comprising:
combining a magnesium salt, aluminum salt, and a ferric salt in stoichiometric proportions within 5 mol. % in an aqueous solvent comprising menthol or dextrose, to obtain a first mixture;
heating the first mixture to remove at least 99.5 wt. % of the aqueous solvent to obtain a first solid;
grinding the first solid into a first powder;
calcining the first powder at a temperature in a range of from 600 to 800° C. for a time in a range of from 2 to 4 hours to obtain a second solid;
grinding the second solid and urea, in a ratio of 2 to 100 parts by weight of the urea to 1 part by weight of the second solid, to form the nanocomposite, into a second powder;
heating the second powder at a temperature in a range of from 550 to 650° C. for a time in a range of from 15 minutes to 1.5 hours to obtain the nanocomposite, comprising graphitic $C_3N_4$, $Fe_2O_3$, and $MgAl_2O_4$ in a mass relationship to each other in a range of from 5 to 15:2 to 7:75 to 95.

2. The method of claim 1, wherein the average pore distribution of the nanocomposite is bimodal, and
wherein a BET specific surface area of the nanocomposite is in a range of from 15 to 45 $m^2/g$, and/or
wherein a first average pore diameter of the first mode of the nanocomposite, according to BJH measurement method, is in a range of from 6.3 to 10.03 nm, with a second average pore diameter of the second mode of the nanocomposite, according to BJH measurement method, being in a range of from 7.5 to 13 nm, and/or
wherein an average pore volume of the nanocomposite, according to the BJH measurement method, is in a range of from 0.06 to 0.12 $cm^3/g$.

3. The method of claim 1, wherein the nanocomposite has a (311) spinel interplanar spacing in a range of from 0.210 to 0.290 nm, a (006) $Fe_2O_3$ interplanar spacing in a range of from 0.180 to 0.260 nm, a (400) spinel interplanar spacing in a range of from 0.140 to 0.220 nm, a (220) MgO interplanar spacing in a range of from 0.108 to 0.188, a (620) spinel interplanar spacing in a range of from 0.090 to 0.170, and a (119) $Fe_2O_3$, and (622) $Fe_2O_3$ spinel interplanar spacing in a range of from 0.080 to 0.160, according to selected area diffraction.

4. The method of claim 1, wherein the mass relationship of the nanocomposite is in a range of from 9 to 11:4 to 6:84 to 86,
wherein the nanocomposite has a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and a (119) $Fe_2O_3$, and (622) $Fe_2O_3$ spinel interplanar spacing of 0.12±2% nm,
wherein an XRD spectrum of the nanocomposite under Cu-filtered Cu-Kα radiation (1.5418 Å) powered at 45 kV and 10 mA has 2θ peaks of
an $MgAl_2O_4$ spinel phase at 18.9±1, 31.7±1, 44.8±1, 56.2±1, 74.09±1, and 78.1±1°,
an MgO cubic phase at 42.8±1, 62.2±1, and 74.6±1°,
an $Fe_2O_3$ hexagonal phase at 36.9±1, 44.8±1, 59.6±1, and 67.3±1°, and
g-$C_3N_4$-related diffractions at 27.8±1, 36.8±1, 44.6±1, and 67.3±1°, and wherein no more than 1% relative intensity $MgFe_2O_4$ (none) is detected in the XRD spectrum.

5. The method of claim 1, wherein the magnesium salt in the combining comprises $Mg(NO_3)_2$,
wherein the aluminum salt in the combining comprises $Al(NO_3)_3$,
wherein the ferric salt in the combining comprises ferric nitrate,
wherein the heating of the first mixture obtains the first solid with at least 99.9 wt. % of the aqueous solvent removed,
wherein the calcining is at a temperature in a range of from 675 to 725° C. for a time in a range of from 2.75 to 3.25 hours, and
wherein the heating of the second powder is at a temperature in a range of from 590 to 610° C. for a time in a range of from 55 minutes to 1.1 hours.

6. The method of claim 1, wherein the nanocomposite comprises no more than 1 wt. % of $Mg_{0.7}Fe_{0.23}Al_{1.97}O_4$ and $Fe_{1.84}Mg_{5.6}Al_{15.77}O_{32}$, relative to a total metal oxide weight.

7. The method of claim 1, wherein the grinding of the first solid does not comprise ball milling.

8. The method of claim 1, wherein the nanocomposite comprises no more than 1 wt. % $SiO_2$, relative to a total metal oxide weight.

9. The method of claim 1, wherein carbon materials in the nanocomposite comprise no more than 1 wt. % carbon nanotubes, relative to total nanocomposite weight.

10. The method of claim 1, wherein the nanocomposite is not made by hot-pressing.

11. The method of claim 1, wherein the nanocomposite comprises no more than 1 wt. % Co, relative to total nanocomposite weight.

12. The method of claim 1, wherein the nanocomposite comprises no more than 1 wt. % elemental state metal, relative to total nanocomposite weight.

13. The method of claim 1, wherein the nanocomposite comprises no more than 1 wt. % elemental state Co, relative to total nanocomposite weight.

14. The method of claim 1, wherein the nanocomposite comprises no more than 1 wt. % elemental state Fe, relative to total nanocomposite weight.

15. The method of claim 1, wherein the nanocomposite comprises no more than 10 wt. % MgO, relative to a total metal oxide weight.

16. The method of claim 1, wherein the nanocomposite obtained comprises no more than 1 wt. % carbonaceous material besides the graphitic carbon nitride.

17. The method of claim 1, wherein carbon materials in the nanocomposite comprise no nanotubes, relative to total nanocomposite weight.

18. The method of claim 1, wherein the nanocomposite comprises no more than 1 wt. % $Al_2O_3$, relative to a total metal oxide weight.

19. The method of claim 1, wherein the graphitic $C_3N_4$ in the nanocomposite consists essentially of sheet morphologies.

20. A method of manufacturing a nanocomposite, the method comprising:
combining a magnesium salt, aluminum salt, and a ferric salt in an aqueous solvent comprising menthol or dextrose, to obtain a first mixture;
heating the first mixture to remove at least 99.5 wt. % of the aqueous solvent to obtain a first solid;
grinding the first solid into a first powder;

calcining the first powder at a temperature in a range of from 600 to 800° C. for a time in a range of from 2 to 4 hours to obtain a second solid;

grinding the second solid and urea, in a ratio of 2 to 100 parts by weight of the urea to 1 part by weight of the second solid, to form the nanocomposite, into a second powder;

heating the second powder at a temperature in a range of from 550 to 650° C. for a time in a range of from 15 minutes to 1.5 hours to obtain the nanocomposite, comprising graphitic $C_3N_4$, $Fe_2O_3$, and $MgAl_2O_4$ in a mass relationship to each other in a range of from 5 to 15:2 to 7:75 to 95.

* * * * *